Sept. 23, 1952  W. E. ZAMBONI ET AL  2,611,520
GARMENT-SUPPORTING FIXTURE
Original Filed March 18, 1946
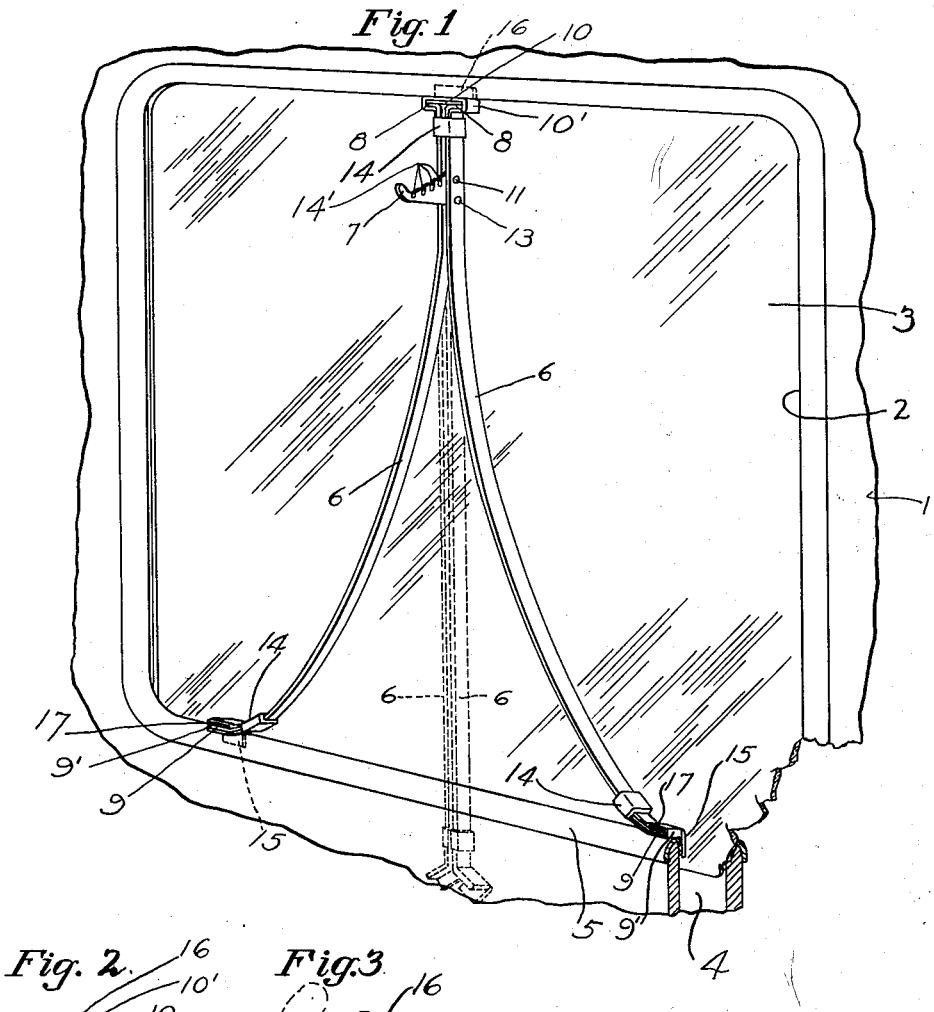
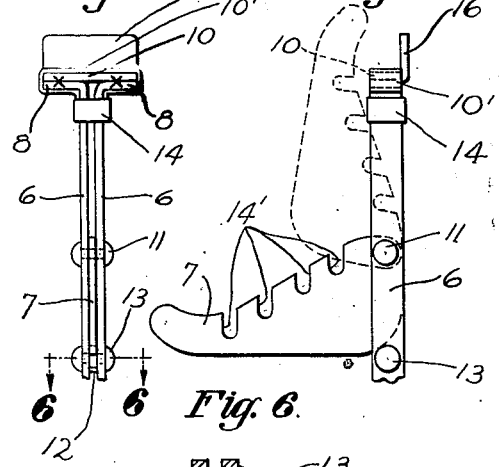
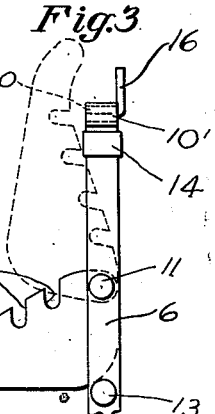
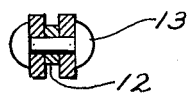
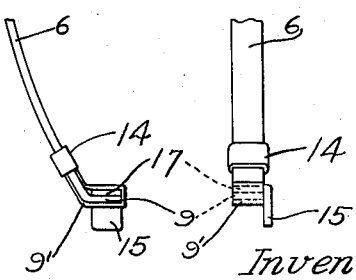
Inventors
William E. Zamboni
Kenneth E. Luger
By their Attorneys
Merchant & Merchant Patented Sept. 23, 1952

2,611,520

UNITED STATES PATENT OFFICE 2,611,520

GARMENT-SUPPORTING FIXTURE

William E. Zamboni, Longview, Wash., and Kenneth E. Luger, Minneapolis, Minn., assignors to Kenneth E. Luger and Catherine P. Luger, a partnership doing business as Kenneth E. Luger Co., Minneapolis, Minn.

Continuation of application Serial No. 655,156, March 18, 1946. This application October 13, 1949, Serial No. 121,140

5 Claims. (Cl. 224—42.45)

Our present invention relates to an improved garment hanger that is particularly designed for use in automobiles and similar vehicles, wherein little or no provision is usually made for the hanging of coats, jackets, and the like, and wherein wall space for the anchoring of conventional hooks or the like is at a premium in view of the large amount of wall area taken up by glazed windows.

This application is filed as a continuation of our copending application, Serial No. 655,156, filed on March 18, 1946.

An important object of the invention is the provision of an improved garment-hanging fixture which can be rigidly but detachably applied to the window frame of an automobile body or the like without the use of tools and without defacing the automobile body.

Other objects of the invention are the provision of a device of the class and for the purpose described which can be produced at very low cost, can be collapsed for shipment in a minimum of space, can be accommodated to window frames of different dimensions, and which may be applied and removed with a minimum of effort.

The above and numerous other highly important objects and advantages of the invention will be made apparent from the following specification, claims, and appended drawings.

In the accompanying drawings, like characters indicate like parts throughout the several views.

Referring to the drawings:

Fig. 1 is a fragmentary perspective view, looking from the inside toward the outside, of that portion of an automobile body including a glazed window opening and frame, and showing one of our improved garment-supporting brackets in operative position with respect to the window and frame;

Fig. 2 is an enlarged fragmentary view showing the upper end portion of the fixture of Fig. 1 in inside edge elevation;

Fig. 3 is a view in side elevation of that portion of the fixture shown in Fig. 2;

Fig. 4 is an enlarged fragmentary detail view in inner edge elevation of the free end portion of one of the laterally resilient legs of the fixture of Fig. 1;

Fig. 5 is a fragmentary view in side elevation of that portion of one of the resilient legs shown in Fig. 4; and Fig. 6 is a fragmentary sectional view, on a still further enlarged scale, taken on the line 6—6 of Fig. 2.

In Fig. 1, the side wall of the body of an automobile or the like is indicated by 1, a window opening by 2, a window glass by 3, a channel into which the glass 3 may be lowered to open the window by 4, and a window frame molding by 5. The elements 1–5 may be considered as being roughly illustrative of conventional automobile body structure wherein the glass panels of the windows are vertically slidably mounted in channels and are opened by being lowered into a suitable channel or receiving space below the window opening. In referring to this conventional structure, the terms "glass" and "glazed" have been used in a broad and liberal sense with the intention of covering all glass substitutes or mechanical equivalents thereof, and the term "window frame" is used in a broad and liberal sense to describe that portion of a wall structure immediately surrounding the window opening regardless of whether such be a separate frame element or an integral part of the wall structure.

The improved fixture, in its preferred commercial embodiment herein illustrated, comprises a pair of like elongated legs 6 and a garment-supporting arm or bracket 7. The elongated legs 6 are made of flat flexible strip material, such as steel or the like, and are quite readily flexed in directions of their minimum cross-sectional dimensions, but are relatively rigid in directions of their maximum cross-sectional dimensions. For the sake of convenience, the term "laterally flexible" may hereinafter be employed in referring to the above described flexibility of the legs. The upper ends of these laterally flexible legs are out-turned at right angles to provide feet 8 and at their lower end portions the legs 6 are turned outwardly at obtuse angles to provide feet 9. The like legs 6, which are substantially straight intermediate their feet-equipped ends 8 and 9, are assembled side by side with their relatively wide flat surfaces in spaced parallel relation and the feet of opposite legs turned laterally outwardly. With the legs thus positioned, a sole plate 10 is disposed over the two feet 8 of the opposite legs and is spot welded or otherwise made fast thereto, and the inner end of the garment-supporting bracket 7 is inserted into the space between the connected upper ends of the legs 6 and is pivoted therebetween by a rivet or the like 11 passed therethrough and the opposite legs 6 and located in spaced relation to the adjacent ends of the legs. The said garment-supporting bracket 7, which is turned upwardly at its upper end portion to become more or less hook-like, is free to move pivotally between its outwardly-extended operative position shown by full lines in Figs. 1 and 3 to an upper inoperative position shown by dotted lines in Fig. 3, and is positively limited against downward movement beyond its outwardly-extended operative position by engagement with a stop 12 in the nature of a tubular spacer mounted on a rivet or the like 13 passed therethrough and through the opposite legs. The feet 9 and the sole plate 10 of the legs 6 are preferably equipped with resilient friction pads 9' and 10' respectively, these pads, in the form illustrated, being in the nature of strips of rubber, synthetic rubber, or the like doubled around their respective feet-forming leg ends, and secured in place by clamping bands or collars 14. Additionally, of course, this rubber stripping forming the resilient friction pads 9' and 10' may be cemented directly to their respective leg portions. The garment-supporting bracket or element 7, as will be seen by reference to Figs. 1 and 3, is provided along its upper edge with a series of notches 14' adapted to receive the hooks of conventional coat hangers and the like. Also, as previously indicated, the outer end of the bracket 7 is turned outwardly to permit the bracket to serve as a hook upon which to directly hang coats, jackets, and the like.

The free end portions of the laterally flexible legs 6 are provided with anchoring flanges 15, and the connected end portions of the legs 6 are provided with common anchoring flange 16. The flat faces of the anchoring flanges 15 and 16 most closely adjacent the legs 6 are disposed in a common plane closely adjacent to and substantially parallel to the plane of the said adjacent longitudinal edges of the legs 6, and which edges are opposite the edges of the legs from which the hook-acting bracket element 7 projects. In the preferred embodiment illustrated, the anchoring flange 16 is integrally formed with the foot 10 and the anchoring flanges 15 are each formed by the free wing of a small angle bracket having its other wing, indicated by 17, overlying and rigidly secured by welding or the like to the free end portion of the outer face of its respective leg 6. Flange 16 projects upwardly in respect to Fig. 1 or outwardly from the connected ends of the legs 6, and the flanges 15 of opposite legs project outwardly and inwardly from the free end portions of their respective legs when the legs are in their normal unflexed relatively straight conditions indicated by dotted lines in Fig. 1.

For shipping purposes, the legs 6 will be substantially parallel and relatively close together as shown by dotted lines in Fig. 1, and the bracket 7 will usually be moved to its upper dotted line position of Fig. 3, whereby to facilitate packing and shipment in the smallest possible space. The over-all length of the fixture will be greater than the vertical measurement of the openings of windows with which the device is designed to operate. To apply the device to the window of an automobile body or the like, the retaining or anchoring flange 16 will be first inserted between the window glass and the upper longitudinally intermediate portion of the window frame until the feet 8, through the medium of the plate 10 and pad 10', operatively engage or seat against the inner marginal edge of the window frame. With this done, the free ends of the legs 6 are spread to effectively foreshorten the fixture until the retaining flange-equipped feet 9 thereof are raised above the bottom inner marginal edge of the window frame, after which the retaining flanges 15 are entered into the space between the window glass 3 and the window frame, to the extent limited by seating of the pad-equipped feet 9 on the bottom inner marginal portion of the window frame. With the device thus positioned, the tendency of the legs to straighten out will, of course, maintain the fixture tightly positioned within the window opening, and the pads 9' and 10' will protect the window frame (that portion of the body surrounding the window opening) from scratching or wearing off of its finish, and will aid in maintaining the legs properly positioned and against sliding action when under load. The hook-acting bracket 7 will, of course, be extended as shown by full lines, for use, but may be folded up out of the way, as shown by dotted lines in Fig. 3, when not in use.

What I claim is:

1. In a garment hanger of the kind and for the purpose set forth, a pair of laterally resilient elongated legs secured together adjacent their upper ends and having their opposite or lower ends free for yielding spreading movements one in respect to the other thereof, a garment-supporting element carried by the connected upper end portions of said legs and projecting therefrom in a direction transversely of the plane of the longitudinal edges of the legs, the connected upper and free lower ends of said legs being adapted to engage opposite inner marginal wall portions of a window frame and being provided with projecting retaining flanges adapted to extend into the space between the window glass and frame, the several retaining flanges being disposed in a common plane closely adjacent to and substantially parallel to the plane of the longitudinal edges of the legs opposite the direction of projection of the garment-supporting element.

2. A garment-supporting fixture comprising a pair of laterally resilient elongated legs connected together adjacent their upper ends in laterally spaced relation but being otherwise free of one another to permit spreading of the legs, a garment-supporting bracket having its inner end portion disposed between the spaced connected upper end portions of the opposite legs and projecting therefrom, the connected upper and free lower ends of said legs being adapted to engage opposite inner marginal wall portions of a window frame and being provided with retaining flanges projecting therefrom and adapted to extend into the space between the window glass and frame of a window, the several retaining flanges being disposed in a common plane closely adjacent to and substantially parallel to the plane of the longitudinal edges of the legs opposite the direction of projection of the garment-supporting bracket.

3. A garment-supporting fixture comprising a pair of laterally resilient legs in the nature of elongated flat strips laid side by side with their flat faces in opposed relation and being connected together at their upper ends, a garment-supporting bracket having its inner end disposed between and anchored between the connected upper end portions of the legs and projecting therefrom, the lower ends and intermediate portions of the legs being free of one another to permit spreading of the legs, the connected upper and free lower ends of said legs being adapted to engage opposite inner marginal wall portions of a window frame and being provided with projecting retaining flanges adapted to extend into the space of the window glass and frame, the several retaining flanges being disposed in a common plane closely adjacent to and substantially parallel to the plane of the longitudinal edges of the legs opposite the direction of projection of the garment-supporting element.

4. A garment-supporting fixture comprising a pair of laterally resilient legs in the nature of elongated flat strips laid side by side with their flat faces in opposed relation and being connected together at their upper ends, a garment-supporting bracket pivoted to the connected upper end portions of one of said legs in spaced relation to the extreme connected end of the pair for pivotal movements between an outwardly-extended operative position and an inoperative position wherein said bracket extends substantially in the direction of the connected ends of the legs, stop means limiting pivotal movements of the bracket in one direction beyond the said operation position thereof, the lower ends and intermediate portions of the legs being free of one another to permit spreading of the legs, the connected upper and free outer ends of said legs being adapted to engage opposite inner marginal wall portions of a window frame and being provided with projecting retaining flanges adapted to extend into the space of the window glass and frame, the several retaining flanges being disposed in a common plane closely adjacent to and substantially parallel to the plane of the longitudinal edges of the legs opposite the direction of projection of the garment-supporting element.

5. In a garment hanger of the kind and for the purpose set forth, a pair of laterally resilient elongated legs secured together adjacent their upper ends, a garment-supporting element carried by and projecting from said connected ends of said legs, the connected upper and free outer ends of said legs being adapted to engage opposite inner marginal wall portions of a window frame and being provided with projecting retaining flanges adapted to extend into the space between the said window glass and frame, said garment-supporting element being pivoted to said legs for arcuate movements between an outwardly-extending operative position and an inoperative position wherein it extends substantially longitudinally of the connected upper ends of the legs.

WILLIAM E. ZAMBONI.
KENNETH E. LUGER.

REFERENCES CITED

The following references are of record in the file of this patent:

UNITED STATES PATENTS

| Number | Name | Date |
| --- | --- | --- |
| 1,706,887 | Knostman | Mar. 26, 1929 |
| 2,157,001 | Morley | May 2, 1939 |
| 2,405,701 | Lange | Aug. 13, 1946 |
| 2,421,741 | Bloss | June 10, 1947 |
| 2,484,535 | Stader | Oct. 11, 1949 |
| 2,514,790 | Ostrow | July 11, 1950 |